United States Patent
Kase et al.

(10) Patent No.: US 9,200,182 B2
(45) Date of Patent: Dec. 1, 2015

(54) PAINT COAT-PROTECTING REMOVABLE PRESSURE-SENSITIVE ADHESIVE SHEET

(71) Applicant: LINTEC CORPORATION, Tokyo (JP)

(72) Inventors: Takamasa Kase, Tokyo (JP); Atsushi Tezuna, Tokyo (JP); Soichiro Fujinaga, Tokyo (JP); Fumio Hayakawa, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 106 days.

(21) Appl. No.: 14/015,375

(22) Filed: Aug. 30, 2013

(65) Prior Publication Data

US 2013/0340932 A1 Dec. 26, 2013

Related U.S. Application Data

(63) Continuation of application No. 13/812,387, filed as application No. PCT/JP2011/066939 on Jul. 26, 2011, now abandoned.

(30) Foreign Application Priority Data

Jul. 28, 2010 (JP) ................. 2010-168844

(51) Int. Cl.
*B29C 65/48* (2006.01)
*B32B 37/12* (2006.01)
*B32B 37/26* (2006.01)
*B32B 38/10* (2006.01)
*B32B 43/00* (2006.01)
*C09J 5/00* (2006.01)
*C09J 7/02* (2006.01)
*C09J 123/08* (2006.01)
*C09J 133/08* (2006.01)
*C08F 210/02* (2006.01)
*C08F 220/18* (2006.01)

(52) U.S. Cl.
CPC ............... *C09J 7/0207* (2013.01); *C09J 7/021* (2013.01); *C09J 123/0869* (2013.01); *C09J 133/08* (2013.01); *C08F 210/02* (2013.01); *C08F 2220/1825* (2013.01); *C08F 2220/1858* (2013.01); *C09J 2203/306* (2013.01); *C09J 2205/114* (2013.01); *C09J 2423/04* (2013.01); *C09J 2431/00* (2013.01); *C09J 2433/00* (2013.01); *Y10T 428/2878* (2015.01)

(58) Field of Classification Search
CPC .......... B32B 7/06; B32B 27/30; B32B 37/12; B32B 38/10; C09J 7/00; C09J 7/70207; C09J 7/021; C09J 123/08; C09J 123/0869; C09J 133/08; C09J 2203/306; C09J 2205/114; C09J 2423/04; C09J 2431/00; C08J 5/214; C08F 210/02; C08F 218/08; C08F 220/06; C08F 220/14; C08F 2220/1825; C08F 2220/1858; C08L 2666/02; Y10T 428/2878
USPC .................... 156/247, 249, 306.6, 306.9, 701
See application file for complete search history.

(56) References Cited

U.S. PATENT DOCUMENTS

| | | | |
|---|---|---|---|
| 4,118,356 A * | 10/1978 | Devona et al. ................ | 524/458 |
| 5,242,963 A | 9/1993 | Mao | |
| 5,747,132 A | 5/1998 | Matsui et al. | |
| 5,872,181 A * | 2/1999 | Daniels et al. ................ | 524/563 |
| 5,882,775 A | 3/1999 | Matsui et al. | |
| 6,030,702 A | 2/2000 | Matsui et al. | |
| 2001/0024721 A1 | 9/2001 | Bohm et al. | |

FOREIGN PATENT DOCUMENTS

| | | | |
|---|---|---|---|
| JP | 10-121007 A | | 5/1998 |
| JP | 3342977 B2 | | 11/2002 |
| JP | 3518677 B2 | | 4/2004 |
| JP | 3668322 B2 | | 7/2005 |
| JP | 2009-269956 A | | 11/2009 |

OTHER PUBLICATIONS

International Search Report for PCT/JP2011/066939 mailed on Nov. 1, 2011.
Non-Final Office Action dated May 30, 2013 in U.S. Appl. No. 13/812,387.

* cited by examiner

*Primary Examiner* — Sing P Chan
(74) *Attorney, Agent, or Firm* — Birch, Stewart, Kolasch & Birch, LLP

(57) ABSTRACT

The present invention is a paint coat-protecting removable pressure-sensitive adhesive sheet comprising a base sheet, and a pressure-sensitive adhesive layer that is provided on the base sheet, the pressure-sensitive adhesive layer being formed of an emulsion pressure-sensitive adhesive composition that includes an emulsion of an ethylene-vinyl carboxylate copolymer as a main component. The present invention provides a paint coat-protecting removable pressure-sensitive adhesive sheet that does not cause swelling, whitening, and adhesive transfer even when the pressure-sensitive adhesive sheet is attached to the surface of a paint coat that has not been sufficiently dried (i.e., contains a small amount of solvent) or has not been sufficiently cured after drying, and removed from the paint coat.

5 Claims, No Drawings

PAINT COAT-PROTECTING REMOVABLE PRESSURE-SENSITIVE ADHESIVE SHEET

This application is a Continuation application of U.S. patent application Ser. No. 13/812,387, filed Mar. 28, 2013, which is the U.S. National Phase of International Application No. PCT/JP2011/066939, filed Jul. 26, 2011. This application also claims priority under 35 U.S.C. §119(a) to Japanese Patent Application No. 2010-168844, filed in Japan on Jul. 28, 2010, the entire contents of which are hereby incorporated by reference.

TECHNICAL FIELD

The invention relates to a paint coat-protecting removable pressure-sensitive adhesive sheet that exhibits excellent removability when attached to an incompletely-cured paint coat that is formed on an automobile, a household electrical appliance, furniture, or the like.

BACKGROUND ART

A protective film (removable pressure-sensitive adhesive sheet) has been attached to an automotive body/part in order to prevent damage during transportation or storage. Particularly in automobile parts A resin automotive bumper on which a paint is applied has been increasingly used instead of a metal bumper in order to reduce the weight of automobiles.

Since a paint coat formed on a resin bumper cannot be cured at a high temperature, the paint coat may be incompletely cured. When a paint coat-protecting removable pressure-sensitive adhesive sheet is attached to such a paint coat (incompletely-cured film), swelling (i.e., a phenomenon in which a change in shape of the pressure-sensitive adhesive sheet such as a small wrinkle, protrusion, or the like formed when attaching the removable pressure-sensitive adhesive sheet is transferred to the paint coat so that the paint coat is deformed), whitening (i.e., a phenomenon in which the composition of the paint coat becomes non-uniform due to the compatibility with the pressure-sensitive adhesive layer of the pressure-sensitive adhesive sheet, so that the paint coat is whitened after the pressure-sensitive adhesive sheet has been removed), adhesive transfer (i.e., a phenomenon in which part of the pressure-sensitive adhesive layer is transferred to the paint coat when removing the pressure-sensitive adhesive sheet), or the like may occur.

Pressure-sensitive adhesive sheets disclosed in Patent Documents 1 to 4 have been known as the paint coat-protecting removable pressure-sensitive adhesive sheet. However, the removable pressure-sensitive adhesive sheets disclosed in Patent Documents 1 to 4 cannot sufficiently protect an incompletely-cured film.

Patent Document 5 discloses an aqueous emulsion-type pressure-sensitive adhesive that contains a copolymer obtained by emulsion polymerization of a monomer composition that contains ethylene, an aliphatic vinyl carboxylate having 8 to 15 carbon atoms, and an alkyl (meth)acrylate in a specific ratio.

However, Patent Document 5 is silent about a removable pressure-sensitive adhesive sheet that is attached to an incompletely-cured film (paint coat).

RELATED-ART DOCUMENT

Patent Document

Patent Document 1: Japanese Patent No. 2701020 (JP-A-9-104850 and U.S. Pat. No. 6,030,702)

Patent Document 2: Japanese Patent No. 3668322 (JP-A-9-291262)

Patent Document 3: Japanese Patent No. 2832565 (JP-A-6-73352, U.S. Pat. No. 5,747,132, and U.S. Pat. No. 5,882,775)

Patent Document 4: Japanese Patent No. 3342977 (JP-A-8-143830)

Patent Document 5: JP-A-2009-269956

SUMMARY OF THE INVENTION

Technical Problem

The invention was conceived in view of the above situation. An object of the invention is to provide a paint coat-protecting removable pressure-sensitive adhesive sheet that does not cause swelling, whitening, and adhesive transfer even when the pressure-sensitive adhesive sheet is attached to the surface of a paint coat that has not been sufficiently dried (i.e., contains a small amount of solvent) or has not been sufficiently cured after drying, and removed from the paint coat.

Solution to Problem

In order to achieve the above object, the inventors of the invention conducted extensive studies on a pressure-sensitive adhesive sheet that includes a pressure-sensitive adhesive layer provided on a base sheet. As a result, the inventors found that a paint coat-protecting removable pressure-sensitive adhesive sheet that does not cause swelling, whitening, and adhesive transfer even when the pressure-sensitive adhesive sheet is attached to the surface of a paint coat that has not been sufficiently dried (i.e., contains a small amount of solvent) or has not been sufficiently cured after drying, and removed from the paint coat, can be obtained by forming the pressure-sensitive adhesive layer of the pressure-sensitive adhesive sheet using a pressure-sensitive adhesive composition that includes an emulsion of an ethylene-vinyl carboxylate copolymer as the main component. This finding has led to the completion of the invention.

Several aspect of the invention provide the following paint coat-protecting removable pressure-sensitive adhesive sheet (see (1) to (6)).

(1) A paint coat-protecting removable pressure-sensitive adhesive sheet including a base sheet, and a pressure-sensitive adhesive layer that is provided on the base sheet, the pressure-sensitive adhesive layer being formed of a pressure-sensitive adhesive composition that includes an emulsion of an ethylene-vinyl carboxylate copolymer as a main component.

(2) The paint coat-protecting removable pressure-sensitive adhesive sheet according to (1), wherein the emulsion of the ethylene-vinyl carboxylate copolymer is an emulsion of (A) a copolymer obtained by subjecting a monomer mixture that includes ethylene and a vinyl carboxylate to emulsion copolymerization, or an emulsion of (B) a copolymer obtained by polymerizing an alkyl (meth)acrylate using the emulsion of the copolymer (A) as a seed emulsion.

(3) The paint coat-protecting removable pressure-sensitive adhesive sheet according to (2), wherein a ratio of a repeating unit derived from the copolymer (A) to a repeating unit derived from the alkyl (meth)acrylate in the copolymer (B) is 10:90 to 99:1 (mass %).

(4) The paint coat-protecting removable pressure-sensitive adhesive sheet according to any one of (1) to (3), wherein a ratio of a repeating unit derived from ethylene to a repeating unit derived from the vinyl carboxylate in the ethylene-vinyl carboxylate copolymer is 10:90 to 30:70 (mass %).

(5) The paint coat-protecting removable pressure-sensitive adhesive sheet according to any one of (1) to (4), wherein the vinyl carboxylate is an aliphatic vinyl carboxylate.

(6) The paint coat-protecting removable pressure-sensitive adhesive sheet according to any one of (1) to (5), wherein the pressure-sensitive adhesive layer has a storage modulus at 23° C. of $3.0\times10^5$ Pa or less, and has a storage modulus at 80° C. of $4.0\times10^4$ Pa or less.

Advantageous Effects of the Invention

The paint coat-protecting removable pressure-sensitive adhesive sheet does not cause swelling, whitening, and adhesive transfer even when the pressure-sensitive adhesive sheet is attached to the surface of a paint coat that has not been sufficiently dried (i.e., contains a small amount of solvent) or has not been sufficiently cured after drying.

DESCRIPTION OF EMBODIMENTS

Exemplary embodiments of the invention are described in detail below.

A paint coat-protecting removable pressure-sensitive adhesive sheet according to one embodiment of the invention (hereinafter may be referred to as "pressure-sensitive adhesive sheet according to one embodiment of the invention") includes a base sheet, and a pressure-sensitive adhesive layer that is provided on the base sheet, the pressure-sensitive adhesive layer being formed of a pressure-sensitive adhesive composition that includes an emulsion of an ethylene-vinyl carboxylate copolymer as a main component.

Base Sheet

The base sheet used in one embodiment of the invention is not particularly limited as long as a paint coat can be protected. A known synthetic resin film may be used as the base sheet.

Examples of the synthetic resin that forms the synthetic resin film include, but are not limited to, polyolefin resins such as a polyethylene resin, a polypropylene resin, and a cycloolefin resin; polyester resins such as a polybutyrene terephthalate resin and a polyethylene terephthalate resin; styrene resins such as a polystyrene resin and an acrylonitrile/butadiene/styrene (ABS) resin; acetate resins; vinyl chloride resins; polyimide resins; polyamide resins; a combination of two or more resins among these synthetic resins; and the like.

Among these, polyolefin resins such as a polypropylene resin and a cycloolefin resin and polyester resins such as a polyethylene terephthalate resin are preferable from the viewpoint of heat resistance, dimensional stability, and cost.

It is also preferable to use a base sheet obtained by depositing a metal (e.g., aluminum) on the synthetic resin film, a base sheet obtained by incorporating a rubber polymer (e.g., conjugated diene polymer rubber, acrylic rubber, ethylene-propylene rubber, fluororubber, chlorosulfonated polyethylene, epichlorohydrin rubber, or silicone rubber) in the synthetic resin film, or the like (hereinafter referred to as "synthetic resin-based resin film").

Among these, a base sheet obtained by incorporating a rubber polymer in the synthetic resin film is preferable, and a base sheet obtained by incorporating a conjugated diene polymer rubber in a polyolefin resin or a polyester resin is particularly preferable, from the viewpoint of heat resistance, dimensional stability, and cost.

Specific examples of the conjugated diene polymer rubber include polybutadiene, polyisoprene, a styrene-butadiene copolymer, a styrene-isoprene copolymer, a styrene-butadiene block copolymer, a styrene-isoprene block copolymer, an acrylonitrile-butadiene copolymer, a styrene-butadiene-styrene block copolymer, a styrene-isoprene-styrene block copolymer, a rubber obtained by hydrogenating the unsaturated bond of the conjugated diene unit of the above rubber, and the like. The content of the conjugated diene polymer rubber in the base sheet is 5 to 30 mass %.

When the base sheet is a resin film (synthetic resin film or synthetic resin-based resin film), the resin film may be unstretched, or may be stretched uniaxially or biaxially (e.g., machine direction and/or transverse direction).

The base sheet may be a single-layer sheet, or may be a multilayer sheet (laminate) (e.g., a sheet in which an intermediate layer is provided on a support substrate), and the base sheet may be colorless and transparent, or may be colored using a pigment (e.g., titanium oxide) or the like.

Characters or the like that is exhibited by the automobile manufacturer or the like during the protection period may be printed on the top side or the back side of the base sheet. For example, a heat-sensitive recording layer, a printing layer or a print quality-improving layer, or the like that allows thermal transfer printing, ink-jet printing, laser printing, or the like, may be provided on the base sheet.

The side of the base sheet on which the pressure-sensitive adhesive layer is formed may be subjected to a treatment that facilitates adhesion (e.g., primer treatment or corona treatment) in order to improve adhesion (i.e., keying force) between the base sheet and the pressure-sensitive adhesive layer.

The thickness of the base sheet is not particularly limited, but is normally 10 to 200 μm, and preferably 25 to 150 μm, from the viewpoint of handling capability.

Pressure-Sensitive Adhesive Layer

The pressure-sensitive adhesive layer included in the pressure-sensitive adhesive sheet according to one embodiment of the invention is formed of the pressure-sensitive adhesive composition that includes the emulsion of the ethylene-vinyl carboxylate copolymer as the main component.

Emulsion of Ethylene-Vinyl Carboxylate Copolymer

The emulsion of the ethylene-vinyl carboxylate copolymer used in one embodiment of the invention is an emulsion of a copolymer that includes at least a repeating unit derived from ethylene and a repeating unit derived from a vinyl carboxylate in the molecule. The term "emulsion" used herein refers to a dispersion in which the ethylene-vinyl carboxylate copolymer is dispersed in water or a mixed solvent of water and a water-miscible organic solvent (hereinafter may be referred to as "aqueous solvent").

The emulsion of the ethylene-vinyl carboxylate copolymer used in one embodiment of the invention is not particularly limited as long as the emulsion is a dispersion in which the ethylene-vinyl carboxylate copolymer is dispersed in the aqueous solvent, but is preferably an emulsion of (A) a copolymer obtained by subjecting a monomer mixture that includes ethylene and a vinyl carboxylate to emulsion copolymerization (hereinafter referred to as "copolymer (A)"), or an emulsion of (B) a copolymer obtained by polymerizing an alkyl (meth)acrylate using the emulsion of the copolymer (A) as a seed emulsion.

The emulsion may include only one type of the copolymer (A) or the copolymer (B), or may include two or more types of the copolymer (A) or the copolymer (B).

Examples of the vinyl carboxylate that is used to produce the ethylene-vinyl carboxylate copolymer include aliphatic vinyl carboxylates, aromatic vinyl carboxylates, and the like.

These vinyl carboxylates may be used either alone or in combination.

It is preferable to use an aliphatic vinyl carboxylate so that the advantageous effects of the invention can be more easily obtained.

Examples of the aliphatic vinyl carboxylates include vinyl acetate, vinyl butyrate, vinyl isobutyrate, vinyl valerate, vinyl isovalerate, vinyl pivalate, vinyl hydroangelate, vinyl caproate, vinyl 2-methylpentanoate, vinyl 3-methylpentanoate, vinyl 4-methylpentanoate, vinyl 2,2-dimethylbutanoate, vinyl 2,3-dimethylbutanoate, vinyl 3,3-dimethylbutanoate, vinyl 2-ethylbutanoate, vinyl caprylate, vinyl caprate, vinyl versatate, vinyl laurate, and the like.

Among these, it is particularly preferable to use vinyl versatate since the low-temperature initial adhesion of the resulting pressure-sensitive adhesive can be improved.

It is preferable that the ratio of a repeating unit derived from ethylene to a repeating unit derived from the vinyl carboxylate in the ethylene-vinyl carboxylate copolymer be 10:90 to 30:70 (mass %).

Production of Copolymer (A)

The copolymer (A) is obtained by subjecting the monomer mixture that includes ethylene and the vinyl carboxylate to emulsion polymerization in an aqueous solvent in the presence of an emulsifier.

The aqueous solvent refers to water or a mixed solvent of water and a water-miscible organic solvent. Examples of the water-miscible organic solvent include alcohols having 1 to 3 carbon atoms, such as methanol, ethanol, propanol, and isopropanol.

An anionic emulsifier, a nonionic emulsifier, a cationic emulsifier, an amphoteric emulsifier, or the like may be used as the emulsifier.

Examples of the anionic emulsifier include potassium oleate, sodium lauryl sulfate, sodium dodecylbenzenesulfonate, sodium alkanesulfonates, sodium alkylnaphthalenesulfonates, sodium dialkylsulfosuccinates, sodium polyoxyethylene alkyl ether sulfates, sodium polyoxyethylene alkyl aryl ether sulfates, and the like.

Examples of the nonionic emulsifier include polyoxyethylene alkyl ethers, polyoxyethylene alkyl aryl ethers, a polyoxyethylene/oxypropylene block polymer, polyoxyethylene glycol fatty acid esters, polyoxyethylene sorbitan fatty acid esters, hydroxyethyl cellulose, and the like.

Examples of the cationic emulsifier include stearylamine hydrochloride, lauryltrimethylammonium chloride, trimethyl(octadecyl)ammonium chloride, and the like.

Examples of the amphoteric emulsifier include lauryl betaine, lauryldimethylamine oxide, and the like.

The emulsifier may be used in an arbitrary amount, but is preferably used in an amount of 5.0 mass % or less, and more preferably 3.0 mass % or less, based on the total amount of the monomer components. When the emulsifier is used in an amount of more than 5.0 mass %, stain resistance may deteriorate.

A peroxide initiator, an azo initiator, a persulfate initiator, or the like may be used for polymerization as a polymeric initiator.

Examples of the peroxide initiator include benzoyl peroxide, lauroyl peroxide, methyl ethyl ketone peroxide, dicumyl peroxide, t-butyl hydroperoxide, hydrogen peroxide, and the like.

Examples of the azo initiator include azobisisobutyronitrile, azobiscyanovaleric acid, azobiscyanopentanoic acid, azobis-2-amidinopropane hydrochloride, and the like.

Examples of the persulfate initiator include ammonium persulfate, potassium persulfate, sodium persulfate, and the like.

Thioglycolic acid, butylmercaptan, octylmercaptan, dodecylmercaptan, laurylmercaptan, 2-ethylhexyl thioglycolate, 2-mercaptoethanol, or the like may be used as a modifier (molecular-weight modifier).

Examples of additional additives include phosphate ester compounds such as polyoxyethylene alkyl ether ester phosphate salts, polyoxyethylene alkyl aryl ether phosphate ester salts, alkyl ether phosphates ester, and the like.

When using a phosphate compound, the phosphate compound is preferably used in an amount of 0.05 to 20 parts by mass, and more preferably 1 to 10 parts by mass, based on 100 parts by mass of the resin component (copolymer (A)). When the phosphate compound is used in an amount of 0.05 parts by mass or more, sufficient stain resistance can be obtained. If the phosphate compound is used in an amount of more than 20 parts by mass, sufficient adhesion may not be obtained.

A further additive such as a preservative, an anti-mold agent, a thickener, a wetting agent, an antifoaming agent, a tackifier, or a plasticizer may also be used when effecting emulsion polymerization. Aqueous ammonia, caustic soda, caustic potash, sodium carbonate, or the like may be used as a pH-adjusting agent. Note that these additives may be added after emulsion polymerization.

The polymerization temperature is preferably 40 to 90° C., and more preferably 50 to 80° C. The reaction time is preferably 2 to 5 hours.

Production of Copolymer (B)

The copolymer (B) may be produced by an arbitrary method. For example, the copolymer (B) may be produced by the following method.

Specifically, an emulsion of the copolymer (A) (hereinafter referred to as "seed emulsion") is obtained in the same manner as described above.

An alkyl (meth)acrylate and an optional additional monomer that is copolymerizable with the alkyl (meth)acrylate are subjected to emulsion polymerization in the presence of the seed emulsion to obtain the copolymer (B).

More specifically, the seed emulsion is added dropwise to an emulsion of an alkyl (meth)acrylate monomer that is obtained by mixing an alkyl (meth)acrylate monomer, an aqueous solution of an emulsifier, and an initiator to effect emulsion polymerization to obtain the copolymer (B).

Alkyl (Meth)Acrylate

Examples of the alkyl (meth)acrylate used to produce the copolymer (B) include esters of (meth)acrylate with an alkyl group having 1 to 20 carbon atoms, such as methyl (meth) acrylate, ethyl (meth)acrylate, propyl (meth)acrylate, butyl (meth)acrylate, amyl (meth)acrylate, 2-ethylhexyl (meth) acrylate, isooctyl (meth)acrylate, n-octyl (meth)acrylate, n-nonyl (meth)acrylate, isononyl (meth)acrylate, decyl (meth)acrylate, and lauryl (meth)acrylate. Note that the expression "(meth)acryl" used herein refers to "acryl" or "methacryl".

Additional Monomer

One or more additional monomers that are copolymerizable with the alkyl (meth)acrylate (hereinafter referred to as "additional monomer") may optionally be used to produce the copolymer (B).

Examples of the additional monomer include hydroxyl group-containing monomers such as hydroxyethyl (meth) acrylate, carboxyl group-containing monomers such as acrylic acid and methacrylic acid, acrylonitrile, methacrylonitrile, (meth)acrylamide, hydroxyalkyl (meth)acrylates in which the hydroxyalkyl group has 1 to 4 carbon atoms, and the like.

The emulsifier, the initiator, the modifier, the additive, and the like that may be used when producing the copolymer (A) may also be used when producing the copolymer (B).

The polymerization temperature when producing the copolymer (B) is preferably 40 to 90° C., and more preferably 60 to 80° C. It is preferable to effect an aging reaction after adding the monomer emulsion. In this case, the reaction temperature is preferably 60 to 90° C., and more preferably 60 to 80° C.

The polymerization time is preferably 2 to 5 hours, and more preferably 3 to 4 hours.

The ratio of a repeating unit derived from the copolymer (A) to a repeating unit derived from the alkyl (meth)acrylate in the copolymer (B) is not particularly limited, but is preferably 10:90 to 99:1, and more preferably 70:30 to 90:10 (mass %).

When the ratio of a repeating unit derived from the copolymer (A) to a repeating unit derived from the alkyl (meth) acrylate in the copolymer (B) is within the above range, it is possible to obtain a paint coat-protecting removable pressure-sensitive adhesive sheet that does not cause swelling or adhesive transfer when removed from the paint coat.

The amount of a repeating unit derived from the additional monomer in the copolymer (B) is preferably 100 parts by mass or less, and more preferably 30 parts by mass or less, based on 100 parts by mass of a repeating unit derived from the alkyl (meth)acrylate. If the amount of a repeating unit derived from the additional monomer exceeds 100 parts by mass, sufficient adhesion may not be obtained. Since the additional monomer is an optional component, the lower limit of the amount of a repeating unit derived from the additional monomer is 0 parts by mass.

The gel fraction of the ethylene-vinyl carboxylate copolymer is preferably 5 to 40%, and particularly preferably 10 to 30%. If the gel fraction of the ethylene-vinyl carboxylate copolymer is 5% or less, adhesive transfer may occur. If the gel fraction of the ethylene-vinyl carboxylate copolymer is 40% or more, swelling may occur.

The pressure-sensitive adhesive layer can be formed using the emulsion pressure-sensitive adhesive composition that includes the emulsion of the ethylene-vinyl carboxylate copolymer as the main component.

The expression "as the main component" means that the emulsion pressure-sensitive adhesive composition includes the emulsion of the ethylene-vinyl carboxylate copolymer as the pressure-sensitive adhesive component, and may optionally include a modifier, a phosphate compound, a preservative, an anti-mold agent, a thickener, a wetting agent, an antifoaming agent, a tackifier, a plasticizer, a pH-adjusting agent, and the like in addition to the emulsion of the ethylene-vinyl carboxylate copolymer.

The pressure-sensitive adhesive layer may be formed by applying the emulsion pressure-sensitive adhesive composition to the base sheet, drying the resulting film, and attaching the dried film to a release film, or may be formed by applying the emulsion pressure-sensitive adhesive composition to a release film, drying the resulting film, and attaching the dried film to the base sheet.

It is preferable that the pressure-sensitive adhesive layer have a storage modulus at 23° C. of $3.0 \times 10^5$ Pa or less, and more preferably $5.0 \times 10^3$ to $1.2 \times 10^5$ Pa, and have a storage modulus at 80° C. of $4.0 \times 10^4$ Pa or less, and more preferably $1.0 \times 10^3$ to $4.0 \times 10^4$ Pa, so that the pressure-sensitive adhesive layer can protect a paint coat. When the storage modulus of the pressure-sensitive adhesive layer is within the above range, it is possible to more effectively prevent a situation in which a change in shape of the pressure-sensitive adhesive sheet is transferred to the paint coat.

Release Film

A film obtained by subjecting one side of a resin film (e.g., polyethylene terephthalate, polyethylene naphthalate, polypropylene, or polyethylene) to a release treatment using a release agent, or the like may be used as the release film.

Examples of the release agent include fluororesins, silicone resins, long-chain alkyl group-containing carbamates, and the like.

The thickness of the release film is not particularly limited, but is normally 10 to 250 μm, and preferably 20 to 200 μm.

The emulsion pressure-sensitive adhesive composition may be applied to the base sheet or the release film using a known coating method (e.g., gravure coating, bar coating, spray coating, spin coating, roll coating, die coating, knife coating, air-knife coating, or curtain coating).

The film of the pressure-sensitive adhesive composition is normally dried at about 80 to about 120° C. (preferably 90 to 110° C.) for 30 seconds to 15 minutes (preferably about 3 to about 7 minutes).

The thickness of the dried pressure-sensitive adhesive layer is normally 1 to 50 μm, and preferably 5 to 40 μm. When the thickness of the dried pressure-sensitive adhesive layer is 1 μm or more, the desired adhesion and cohesive force (holding power) can be obtained. When the thickness of the dried pressure-sensitive adhesive layer is 50 μm or less, it is possible to prevent an increase in cost, and also prevent a situation in which the pressure-sensitive adhesive layer protrudes from the edge.

Examples of an adherend to which the pressure-sensitive adhesive sheet according to one embodiment of the invention is attached include a plastic, a metal, and the like on which a paint coat is formed. The pressure-sensitive adhesive sheet according to one embodiment of the invention is particularly useful as a pressure-sensitive adhesive tape for protecting an incompletely-cured paint coat of a urethane-based paint that is applied to an automotive body, an automotive plastic bumper, or an consumer electronics plastic part.

Since a paint coat formed on the surface of a plastic cannot be cured at a high temperature, differing from a paint coat formed the surface of a metal, from the viewpoint of heat resistance, a paint coat formed on the surface of a plastic is normally cured incompletely, or contains a small amount of solvent.

When a related-art paint coat-protecting pressure-sensitive adhesive tape is attached to a paint coat that is incompletely cured, or contains a small amount of solvent, allowed to stand for a long time, and then removed from the paint coat, a problem such as swelling, whitening, or adhesive transfer may occur. However, a paint coat can be protected using the pressure-sensitive adhesive tape according to one embodiment of the invention without causing such a problem.

EXAMPLES

The invention is further described below by way of examples. Note that the invention is not limited to the following examples.

The following raw materials were used in the examples.
Raw Material
Ethylene
Ethylene (hereinafter referred to as "Et") manufactured by Mitsubishi Chemical Corporation
Vinyl Ester
Vinyl acetate (hereinafter referred to as "VAC") manufactured by Nippon Synthetic Chemical Industry Co., Ltd.
Vinyl versatate (hereinafter referred to as "VV") manufactured by Shell Chemical Company
Acrylic Monomer Mixture The following acrylic monomers were used.
2-Ethylhexyl acrylate (hereinafter referred to as "2EHA") manufactured by Mitsubishi Chemical Corporation
Butyl acrylate (hereinafter referred to as "BA") manufactured by Mitsubishi Chemical Corporation
Methyl methacrylate (hereinafter referred to as "MMA") manufactured by Mitsubishi Rayon Co., Ltd.
Acrylic acid (hereinafter referred to as "AA") manufactured by Mitsubishi Chemical Corporation
Emulsifier
A mixture containing an equal amount of the following emulsifiers (hereinafter referred to as "emulsifier A") was used.
Sodium dodecylbenzenesulfonate ("Neopelex G-65" manufactured by Kao Corporation)
Polyoxyethylene alkyl ether ("Emulgen 1118S-70" manufactured by Kao Corporation)
Base Film
A resin film (thickness: 70 μm) formed of a cycloolefin resin, titanium oxide, and a styrene-butadiene rubber was used as the base film.
Release Film
A polyethylene terephthalate film (thickness: 38 μm, "SP-381031" manufactured by Lintec Corporation) was used as the release film.

Production Examples 1, 2, and 5

Preparation of Seed Emulsion

A pressure vessel was charged with 10 parts by mass of vinyl acetate, 80 parts by mass of vinyl versatate, 100 parts by mass of water, and 2 parts by mass of the emulsifier A, and the mixture was heated to 50° C. 0.5 parts by mass of 1% potassium persulfate and 0.1 parts by mass of sodium formaldehyde sulfoxylate were added dropwise to the mixture over 2 hours in a nitrogen atmosphere while adding 20 parts by mass of ethylene to effect emulsion polymerization to obtain a seed emulsion.
Preparation of Emulsion Pressure-Sensitive Adhesive Composition
A reaction vessel equipped with a thermometer, a reflux condenser, a stirrer, and a dropping funnel was charged with the seed emulsion (see Table 1 (solid content)) and 20 parts by mass of water, and the mixture was heated to 70° C. After the addition of 0.3 g of azobis-2-amidinopropane hydrochloride ("V-50" manufactured by Wako Pure Chemical Industries, Ltd.) to the reaction vessel, a monomer emulsion prepared by mixing the acrylic monomer mixture (2EHA/MMA/AA=93/5/2 (mass ratio)) (see Table 1), the emulsifier A (see Table 1), and 27 parts by mass of water, was added to the mixture over 2 hours. The mixture was aged at 80° C. for 2 hours to obtain an ethylene-vinyl carboxylate copolymer emulsion pressure-sensitive adhesive (emulsion pressure-sensitive adhesive compositions 1, 2, and 5) of Example 1.

Production Example 3

The seed emulsion obtained in Production Example 1 was used as a pressure-sensitive adhesive composition 3 (i.e., the acrylic monomer mixture was not subjected to emulsion polymerization).

Production Example 4

A pressure-sensitive adhesive composition 4 was obtained in the same manner as in Production Example 1, except that the components of the acrylic monomer mixture were changed to BA/MMA/AA=93/5/2 (mass ratio), and the amounts of the seed emulsion and the acrylic monomer mixture were changed as shown in Table 1.

Production Example 6

A pressure-sensitive adhesive composition 6 was obtained in the same manner as in Production Example 1, except that the components of the acrylic monomer mixture were changed to BA/2EHA/MMA/AA=46.5/46.5/5/2 (mass ratio).

Production Example 7

A pressure-sensitive adhesive composition 7 was obtained in the same manner as in Production Example 1, except that the components of the acrylic monomer mixture were changed to 2EHA/AA=98/2 (mass ratio).

Production Example 8

A pressure-sensitive adhesive composition 8 was obtained in the same manner as in Production Example 1, except that 90 parts by mass of vinyl acetate was used instead of 10 parts by mass of vinyl acetate and 80 parts by mass of vinyl versatate.

TABLE 1

| | Seed emulsion (parts by mass) | Acrylic monomer mixture (parts by mass) | Emulsifier A (parts by mass) |
|---|---|---|---|
| Production Example 1 | 80 | 20 | 2 |
| Production Example 2 | 20 | 80 | 2 |
| Production Example 3 | 100 | 0 | 0 |
| Production Example 4 | 85 | 15 | 2 |
| Production Example 5 | 50 | 50 | 2 |
| Production Example 6 | 80 | 20 | 2 |
| Production Example 7 | 80 | 20 | 2 |
| Production Example 8 | 80 | 20 | 2 |

Examples 1 to 5 and Reference Examples 1 to 3

Examples 1 to 8

The pressure-sensitive adhesive composition (pressure-sensitive adhesive compositions 1 to 8 obtained in Production Examples 1 to 8) was applied to the base film using an applicator so that the amount of the pressure-sensitive adhesive composition after drying was 25 g/m$^2$, and the resulting film was dried at 90 to 100° C. to obtain a pressure-sensitive adhesive sheet (pressure-sensitive adhesive sheets 1 to 8).
The pressure-sensitive adhesive sheet (pressure-sensitive adhesive sheets 1 to 8 obtained in Examples 1 to 5 and Reference Examples 1 to 3) was cut to have a size of 10×150 mm to obtain a specimen.
The storage modulus (at 23° C. and 80° C.) of the pressure-sensitive adhesive layer of the pressure-sensitive adhesive sheet (pressure-sensitive adhesive sheets 1 to 8) was measured as described below using the specimen. The results are shown in Table 2.

Storage Modulus

A columnar specimen (diameter: 8 mm, thickness: 3 mm) was prepared by stacking the pressure-sensitive adhesives (thickness: 30 μm), and the storage modulus of the specimen was measured under the following conditions using a torsional shear method in accordance with JIS K 7244.
Measurement system: dynamic viscoelasticity analyzer "DYNAMIC ANALYZER RDA II" manufactured by Rheometrics Scientific Inc.
Frequency: 1 Hz
Temperature: 23° C. or 80° C.

TABLE 2

| | Storage modulus (Pa) | |
|---|---|---|
| | 23° C | 80° C |
| Example 1 | $1.1 \times 10^5$ | $1.3 \times 10^4$ |
| Reference Example 1 | $6.4 \times 10^4$ | $2.3 \times 10^4$ |
| Reference Example 2 | $2.0 \times 10^5$ | $1.7 \times 10^4$ |
| Example 2 | $2.4 \times 10^5$ | $2.9 \times 10^4$ |
| Reference Example 3 | $8.9 \times 10^4$ | $2.0 \times 10^4$ |

TABLE 2-continued

| | Storage modulus (Pa) | |
|---|---|---|
| | 23° C | 80° C |
| Example 3 | $1.9 \times 10^5$ | $2.2 \times 10^4$ |
| Example 4 | $9.0 \times 10^5$ | $1.1 \times 10^4$ |
| Example 5 | $1.9 \times 10^5$ | $3.5 \times 10^4$ |

Preparation of Paint Coat (Adherend)

A mixture of 100 parts by mass of two-component polyurethane top coat for automotive ("Quartz Clear Z" manufactured by of Kansai Paint Co., Ltd.) and 40 parts by mass of a multi-curing agent was sprayed onto a polyolefin thermoplastic elastomer sheet on which an electrodeposition primer and an intermediate coat were painted so that the thickness after drying was about 20 μm, dried at 60° C. for 30 minutes, and allowed to stand at room temperature for 30 minutes to obtain a (incompletely-cured) paint coat.

The pressure-sensitive adhesive sheet (pressure-sensitive adhesive sheets 1 to 8 obtained in Examples 1 to 5 and Reference Examples 1 to 3) was attached to the paint coat (adherend), allowed to stand at room temperature for 24 hours, or allowed to stand at 80° C. for 24 hours, cooled to room temperature, and removed from the paint coat. The appearance of the paint coat was observed with the naked eye, and evaluated in accordance with the following standard.

Swelling

A case where swelling was not observed was evaluated as "Excellent", a case where swelling was observed to only a small extent was evaluated as "Good", and a case where swelling was clearly observed was evaluated as "Poor". The evaluation results are shown in Table 3.

Adhesive Transfer

A case where adhesive transfer to the paint coat was not observed with the naked eye was evaluated as "Excellent", a case where adhesive transfer to the paint coat was observed to only a small extent with the naked eye (i.e., the adhesive could be easily removed from the paint coat) was evaluated as "Good", and a case where adhesive transfer to the paint coat was clearly observed with the naked eye was evaluated as "Poor". The evaluation results are shown in Table 3.

Whitening

A case where whitening was not observed was evaluated as "Excellent", a case where whitening was observed to only a small extent (i.e., whitening could be removed by wiping) was evaluated as "Good", and a case where whitening was observed after wiping the paint coat, and allowing the specimen to stand outdoors for 1 week was evaluated as "Poor". The evaluation results are shown in Table 3.

TABLE 3

| | 23° C. | | | 80° C. | | |
|---|---|---|---|---|---|---|
| | Swelling | Adhesive transfer | Whitening | Swelling | Adhesive transfer | Whitening |
| Example 1 | Excellent | Excellent | Excellent | Excellent | Good | Excellent |
| Reference Example 1 | Good | Excellent | Excellent | Good | Good | Excellent |
| Reference Example 2 | Excellent | Excellent | Good | Excellent | Good | Good |
| Example 2 | Excellent | Excellent | Excellent | Excellent | Good | Excellent |
| Reference Example 3 | Good | Excellent | Excellent | Excellent | Good | Excellent |
| Example 3 | Excellent | Excellent | Excellent | Good | Good | Excellent |
| Example 4 | Excellent | Excellent | Excellent | Good | Good | Excellent |
| Example 5 | Good | Good | Good | Good | Good | Good |

As shown in Table 3, the pressure-sensitive adhesive sheets of Examples 1 to 5 and Reference Examples 1 to 3 did not cause swelling, adhesive transfer, and whitening.

The invention claimed is:

1. A method of using a pressure-sensitive adhesive sheet as a removal adhesive sheet for protecting an incompletely-cured coat, which comprises:
providing the pressure-sensitive adhesive sheet comprising a base sheet and a pressure-sensitive adhesive layer on the base sheet, the pressure-sensitive adhesive layer being formed of an emulsion pressure-sensitive adhesive composition that includes an emulsion of an ethylene-vinyl carboxylate copolymer as a main component, wherein the emulsion of the ethylene-vinyl carboxylate copolymer is an emulsion of a copolymer (B) obtained by polymerizing an alkyl(meth)acrylate using an emulsion of a copolymer (A) that is obtained by subjecting a monomer mixture that includes ethylene and a vinyl carboxylate to emulsion copolymerization as a seed emulsion and the ratio of repeating unit originating from copolymer (A) to a repeating unit originating from alkyl (meth)acrylate in copolymer (B) is 70:30 to 90:10 (mass %), and
attaching the pressure sensitive adhesive sheet to an incompletely cured coat, and then
removing the pressure sensitive adhesive sheet from the coat without swelling or whitening of the coat or adhesive transfer.

2. The method according to claim 1, wherein a ratio of a repeating unit derived from ethylene to a repeating unit derived from the vinyl carboxylate in the ethylene-vinyl carboxylate copolymer is 10:90 to 30:70 (mass %).

3. The method according to claim 1, wherein the vinyl carboxylate is an aliphatic vinyl carboxylate.

4. The method according to claim 1, wherein the pressure-sensitive adhesive layer has a storage modulus at 23° C. of $3.0 \times 10^5$ Pa or less, and has a storage modulus at 80° C. of $4.0 \times 10^4$ Pa or less.

5. The method according to claim 1, wherein the incompletely-cured coat is formed of urethane-containing coating material.

* * * * *